United States Patent [19]

Van Exel et al.

[11] Patent Number: 4,591,192
[45] Date of Patent: May 27, 1986

[54] QUICK CONNECT COUPLING

[75] Inventors: Gary A. Van Exel, Fullerton; Victor Perez, Pomona; Alfredo B. Marmol, West Covina, all of Calif.

[73] Assignee: Rain Bird Consumer Products Mfg. Corp., Duarte, Calif.

[21] Appl. No.: 590,046

[22] Filed: Mar. 15, 1984

[51] Int. Cl.⁴ .................................................. F16L 33/16
[52] U.S. Cl. ..................................... 285/83; 285/305; 285/306; 285/308; 285/423
[58] Field of Search ............... 285/305, 308, 317, 319, 285/404, 321, 423, 83, 102, 306

[56] References Cited

U.S. PATENT DOCUMENTS

| | | |
|---|---|---|
| 404,429 | 6/1889 | Pearce et al. . |
| 489,107 | 1/1893 | Storz . |
| 700,798 | 5/1902 | Morris, Jr. . |
| 724,324 | 3/1903 | Parsons . |
| 1,217,041 | 2/1917 | Martz . |
| 1,248,558 | 12/1917 | Scribner . |
| 1,489,310 | 4/1924 | Critchlow ................. 285/305 X |
| 1,513,710 | 10/1924 | Lewis ........................ 285/305 X |
| 1,971,578 | 8/1934 | Richardson . |
| 2,023,428 | 12/1935 | Liebhardt .................. 285/317 X |
| 2,132,506 | 10/1938 | Allen . |
| 2,250,199 | 7/1922 | Kelly . |
| 2,257,321 | 9/1941 | Arnold . |
| 2,419,702 | 4/1947 | Barnes . |
| 2,724,441 | 11/1955 | Rogers ....................... 285/306 X |
| 2,816,779 | 12/1957 | Jensen . |
| 3,342,510 | 9/1967 | Walters ............................. 285/83 |
| 3,346,277 | 10/1967 | Ludwig ..................... 285/321 X |
| 3,351,362 | 11/1967 | Hansen ............................ 285/83 |
| 3,357,721 | 12/1957 | Hollanszky et al. . |
| 3,382,892 | 5/1968 | Cerbin . |
| 3,383,123 | 5/1968 | Murray ............................. 285/83 |
| 3,428,340 | 2/1969 | Pelton ....................... 285/308 X |
| 3,538,940 | 11/1970 | Graham ..................... 285/306 X |
| 3,645,562 | 2/1972 | Fandetti et al. . |
| 3,753,582 | 8/1973 | Graham ........................... 285/305 |
| 3,758,137 | 9/1973 | Kershaw . |
| 3,831,984 | 8/1974 | Kutina et al. . |
| 3,877,731 | 4/1975 | Kraus et al. . |
| 3,990,727 | 11/1976 | Gallagher . |
| 4,145,076 | 3/1979 | Snow ............................... 285/305 |
| 4,216,982 | 8/1980 | Chow . |
| 4,244,608 | 1/1981 | Stuemky ........................ 285/305 |

FOREIGN PATENT DOCUMENTS 2839635  4/1979  Fed. Rep. of Germany ...... 285/305

Primary Examiner—Dave W. Arola
Attorney, Agent, or Firm—Fulwider, Patton, Rieber, Lee & Utecht

[57] ABSTRACT

An improved quick connect coupling is provided for releasably connecting a pair of conduits, such as ordinary garden hose. The coupling comprises interlocking male and female fittings adapted for respective connection to a pair of hoses, wherein the male fitting includes a male member with an external circumferential groove for axial alignment with a generally opposed pair of arcuate slots in a female member on the female fitting. A C-shaped retainer is carried about the female fitting and includes a central spring base supporting a pair of locking arms which terminate in free ends having axially projecting lock tabs at the radially inner edges thereof, wherein these locking arms extend through the arcuate slots to position the arm free ends in engagement with radially oriented cam surfaces on the female member. In a normal unstressed condition of the retainer, the radially inner edges of the locking arms including the lock tabs extend into the male member groove to lock the coupling. When the coupling is subjected to water pressure, slight axial displacement of the male and female fittings move the lock tabs into locking engagement with the inner diameter surface of the female fitting thereby preventing retainer expansion and resultant inadvertent coupling disconnection. When the water pressure is turned off, however, the retainer spring base can be pushed radially inwardly to displace the locking arm free ends along the cam surfaces and outwardly from the male member groove to unlock the coupling.

13 Claims, 6 Drawing Figures

U.S. Patent   May 27, 1986   Sheet 1 of 2   4,591,192
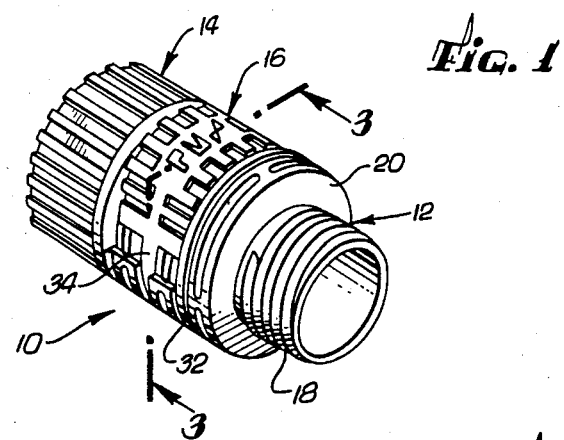
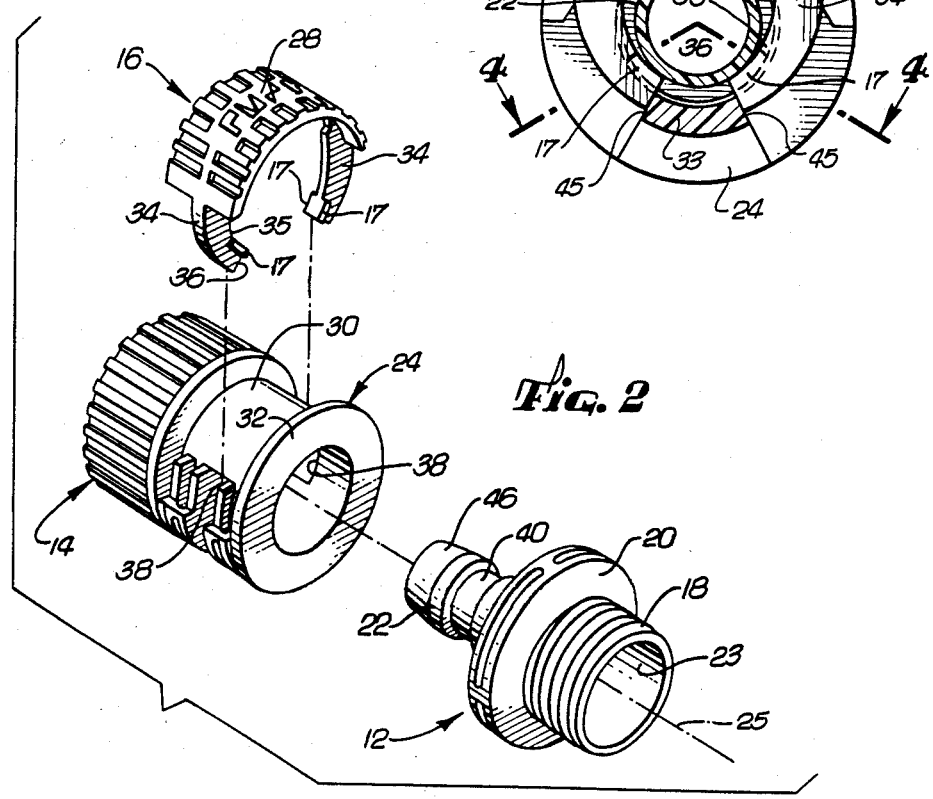

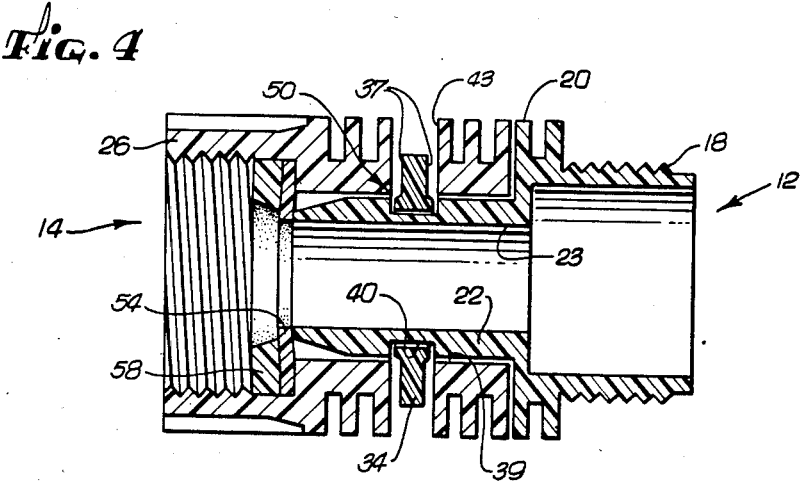
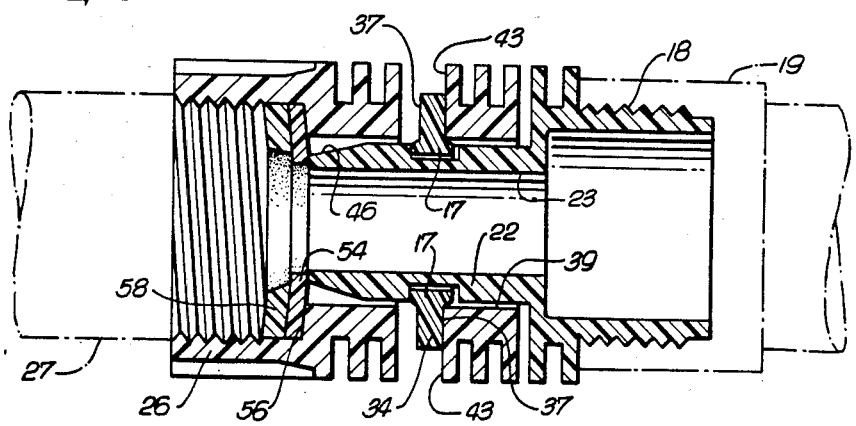
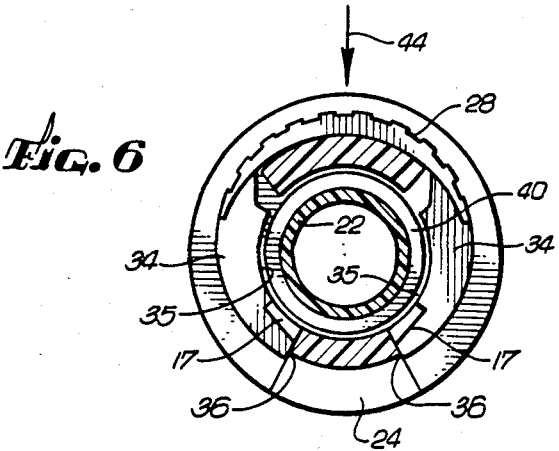

QUICK CONNECT COUPLING

BACKGROUND OF THE INVENTION

This invention relates generally to so-called quick connect couplings for rapidly connecting a pair of fluid-carrying conduits in a releasably yet substantially leak-free manner. More particularly, this invention relates to an improved quick connect coupling particularly of the type disclosed and claimed in commonly assigned co-pending application Ser. No. 414,786, filed Sept. 3, 1982, for connection and disconnection of conduits such as ordinary garden hose or the like.

Quick connect couplings in general are known for releasably connecting a pair of fluid-carrying conduits or pipes in end-to-end relation, thereby providing a single elongated fluid flow path while permitting rapid conduit separation when desired. Such couplings typically comprise a pair of slidably interfitting male and female members adapted for respective connection to adjacent ends of the pair of conduits and further associated with a releasable locking mechanism for retaining the male and female members in locked relation. Such quick connect couplings are commonly used for releasably connecting ordinary garden hose or the like wherein the coupling is required to withstand relatively low fluid pressures without leakage. In this type of environment, it is highly desirable to provide a coupling constructed from a minimum number of components formed inexpensively, for example, from molded plastic or the like, with a geometry permitting connection or disconnection with minimum difficulty and/or manipulation of parts. At the same time, however, the coupling must be sufficiently strong to withstand axial forces and twisting forces encountered during use without breakage or undesired separation.

A variety of quick connect coupling designs have been proposed in an effort to meet the above-described design criteria. For example, according to one common coupling design, interfitting male and female members are associated with a twist lock mechanism wherein the coupling is connected by inserting the male member into the female member and then twisting the members relative to each other to seat internal locking tabs within corresponding locking recesses. With this type of coupling, however, the requisite twisting movement imparts a corresponding twist to the hoses which typically have a resilient plastic or rubber construction tending to return to an untwisted state, thereby occasionally unlocking the coupling.

Alternative quick connect couplings for garden hoses and the like have been proposed wherein the male and female members are locked and unlocked without significant twisting movement, such as those devices depicted in U.S. Pat. Nos. 3,990,727 and 4,216,982. Devices of this type, however, have generally included relative complex locking mechanisms having a relatively large number of mechanical parts thereby increasing the cost of the coupling and the likelihood of mechanical failure. Alternatively, these devices have included locking mechanisms which are particularly difficult to align for proper connecting and disconnecting movement or which include relatively small and typically beveled locking surfaces which are unable to withstand significant axial loads during use without separation or breakage.

In copending application Ser. No. 414,786, an improved quick connect coupling is disclosed wherein a relatively simple, C-shaped locking retainer is provided for releasable connection of male and female members without twisting movement. The C-shaped retainer is carried about the female member and includes locking arms extending through arcuate slots in the female member for normal locked reception into an aligned circumferential groove in the male member to lock the coupling. In this normal position, free ends of the locking arms ride against radially oriented cam surfaces on the female member, whereby the locking arms can be forced against the cam surfaces resulting in increased radial separation of the arms sufficient to disconnect the male and female members. While this quick connect coupling provides significant improvements with respect to previous coupling designs, occasional inadvertent disconnection can still occur, particularly when the coupling is subjected to water pressure simultaneously with substantial twisting forces derived, for example, from a twisted hose to which the coupling is connected.

The present invention overcomes the problems and disadvantages of the art by providing a further improved quick connect coupling of the general type described and claimed in copending application Ser. No. 414,786, where the coupling further includes means for positively locking the coupling against the inadvertent separation when the coupling is subjected to water pressure.

SUMMARY OF THE INVENTION

In accordance with the invention, a quick connect coupling is provided for quickly and easily connecting or disconnecting a pair of fluid-carrying conduits, particularly such as garden hose. The coupling comprises interlocking male and female fittings adapted for connection to a pair of hoses and for relatively close sliding reception of the male fitting into the female fitting. A generally C-shaped spring retainer of simplified and preferably one-piece construction is carried about the female member for movement between a locked position with a pair of locking arms engaged with the male fitting and an unlocked position with the locking arms retracted from the male fitting. Axially projecting lock tabs on the locking arms are provided to engage and lock with the female fitting when the coupling is subjected to fluid pressure, thereby positively locking the coupling against inadvertent separation.

More particularly, in accordance with the preferred form of the invention, the male fitting has a generally tubular shape including a hose connector at one end for conventional threaded connection to a hose and a tubular male member at an opposite end for relatively close sliding reception into the female fitting. An external circumferential groove is formed in the male member at a position generally intermediate its length. The female fitting also has a generally tubular shape to include a hose connector for threaded connection to another hose and a sleeve-like female member for receiving the male member of the male fitting. Importantly, the female member defines a pair of generally opposed arcuate slots at an axial position for alignment with the external groove in the male member, wherein these slots terminate at adjacent ends in a pair of generally radially oriented cam surfaces.

The C-chaped retainer includes a central spring base supporting the pair of locking arms in a generally opposed relation, wherein these locking arms terminate with spaced free ends and have radially inner edges supporting the axially projecting lock tabs. Th axial widths of the locking arms including the lock tabs is at least slightly less than the axial width of the arcuate slots in the female member to permit retainer installation about the female member with the locking arms and tabs extending generally into and through said arcuate slots with the free ends of the locking arms in respective engagement with the radial cam surfaces. The inherent resiliency of the retainer material normally positions the radially inner edges of the locking arms and the tabs within the male member groove to lock the fittings against axial separation.

When the locked coupling is subjected to water pressure, the male and female fittings undergo a slight axial displacement resulting in a corresponding axial displacement of the locking arms within the arcuate slots. This movement carries the lock tabs on the locking arms to axial positions slightly offset from the arcuate slots and radially within a portion of the female member for engagement with the inner diameter surface thereof upon attempted removal of the locking arms from the male member groove. As a result, the arms are positively locked into the groove to prevent intended or inadvertent coupling separation. However, when the water pressure is turned off, the locking arms tend to return to axially centered positions with respect to the arcuate slots whereupon the retainer central base can be depressed radially inwardly toward the female member to displace the locking arms radially outwardly along the cam surfaces, thereby retracting the locking arms from the groove to unlock the fittings.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating an improved quick connect coupling embodying the novel features of the invention;

FIG. 2 is an exploded perspective view of the quick connect coupling;

FIG. 3 is an enlarged transverse vertical section of the coupling taken generally on the line 3—3 of FIG. 1 and illustrating the coupling in a locked condition;

FIG. 4 is an enlarged longitudinal section of the coupling taken generally on the line 4—4 of FIG. 3;

FIG. 5 is an enlarged longitudinal section of the coupling generally similar to FIG. 4 and illustrating the coupling connected between a pair of hoses and subjected to water pressure; and FIG. 6 is an enlarged transverse vertical section of the coupling generally similar to FIG. 3 and illustrating the coupling in an unlocked condition.

DETAILED DESCRIPTION OF THE PREFERRED EMBODIMENT

As illustrated in the exemplary drawings, a quick connect coupling referred to generally by the reference numeral 10 is provided for quickly and easily connecting a pair of fluid-carrying conduits (not shown in FIG. 1) particularly such as ordinary garden hose or the like. The quick connect coupling 10 has a simplified and inexpensive construction including interlocking male and female fittings 12 and 14 for respective connection to a pair of hoses and a relatively simple and easily manipulated spring retainer 16 for releasably locking the fittings 12 and 14 with respect to each other. Short axially protruding lock tabs 17 (FIG. 2) on the retainer 16 are provided for engaging the female fitting 14 when the locked coupling is subjected to water pressure to positively lock the fittings against intended or inadvertent separation until the water pressure is turned off.

The quick connect coupling 10 of the present invention provides an improvement upon quick connect couplings of the type described in commonly assigned, copending application Ser. No. 414,786, the subject matter of which is incorporated by reference herein. More particularly, the improved coupling 10 advantageously provides a relatively simple and substantially leak-free device for converting multiple lengths of hose to a single fluid-carrying structure of increased length. The coupling 10 is constructed from a minimum number of parts configured for relatively easy and preferably one-handed manipulation to lock or unlock the coupling, wherein these parts are conveniently constructed from relatively lightweight and inexpensive materials, such as molded plastic or the like. Locking surfaces of the coupling are quickly and easily aligned and displaced relative to each other while at the same time providing relatively large engagement surface areas capable of withstanding relatively high axial forces during use without significant separation or breakage. Moreover, the axial tabs 17 on the retainer 16 provide a water pressure-responsive means for positively locking the coupling against separation while in use.

The improved quick connect coupling 10 is shown in detail in FIGS. 1-6 which illustrate a preferred generally tubular interlocking geometry of the male and female fittings 12 and 14. More particularly, the male fitting 12 includes at one end a hose connector 18 of a selected standard size for appropriate connection to one hose 19 (FIG. 5), with a conventional male threaded hose connector 18 being illustrated by way of example. This hose connector 18 is formed integrally with a radially enlarged flange 20 which is in turn joined to a tubular male member 22 of smaller diameter projecting generally along a central axis 15 common to the hose connector 18. Together, the hose connector 18 and the tubular male member 22 define an uninterrupted flow path 23 providing a continuation of the flow path formed through the hose 19 to which the hose connector 18 is secured.

The male member 22 is sized and shaped for relatively close sliding reception into an open outboard end of a sleeve-like female member 24 at one end of the female fitting 14. This female member 24, as shown best in FIG. 5, is joined preferably with an integral construction to a second hose connector 26 illustrated in the form of a threaded female hose connector of standard size for appropriate connection to a second hose 27. Alternatively, if desired or required, the male and female fittings 12 and 14 can be constructed to include identical hose connectors 18 and 26 or hose connectors having any other configuration adapted for suitable connection to a pair of hoses or other conduits.

The female fitting 14 provides a support structure for the spring retainer 16 which is movably mounted for selective locking engagement with the male member 22 of the male fitting 12. More specifically, the retainer 16 is constructed from a relatively rigid yet somewhat resilient spring material, preferably such as molded plastic or the like, to have a generally C-shaped configuration for reception about the female member 24 of the female fitting 14. In this regard, the retainer 16 has a sufficient arcuate length and is formed generally on a sufficiently small radius to prevnt the retainer from falling off the female member or being easily removed therefrom during normal use.

The C-shaped retainer 16 comprises an arcuate and relatively thin, generally plate-shaped central spring base 28 having an axially elongated shape for relatively close reception into a semi-annular cavity 30 formed between the hose connector 26 and an enlarged flange 32 at the outboard end of the female member 24. This central base 28 constitutes a spring plate disposed between a generally opposed pair of generally arcuate locking arms having curved radialy inner edges 35 and terminating in a respective pair of generally radially oriented free ends 36 spaced a short distance from each other. In accordance with the improved coupling of the present invention, the lock tabs 17 are formed on the locking arms adjacent the free ends 36 and generally along the inner edges 35 to project axially from axial side faces 37 of the locking arms 34 in at least an outboard direction relative to the female member 24 toward the enlarged flange 32. More preferably, however, the lock tabs 17 are formed to project axially in pairs from the opposite side faces 37 of the lower arms, as depicted in the illustrative embodiment to permit reversible installation of the retained 16 about the female member 24, as will be described.

The retainer 16 is mounted about the female member 24 of the female fitting 14 with the locking arms 34 received respectively into a generally opposed pair of arcuate slots 38 formed in the female member to have a substantial arcuate dimension, such as about 90 to 110 degrees, as illustrated in the exemplary drawings. In this regard, the combined axial width of each locking arm 34 and its associated lock tabs 17 is chosen to permit sliding reception thereof into and through the associated arcuate slots 38 in the female member.

In this position, in a normal unstressed condition, as viewed in FIGS. 3 and 4, the free ends 36 of the locking arms 34 contact radially oriented cam surfaces 45 formed at opposite ends of a strip segment 33 of the female member separating the lower ends of the arcuate slots 38, and the central spring base 28 is spaced radially outwardly a short distance from another strip segment 42 separating the upper ends of the arcuate slots. This places the radially inner edges 35 of the locking arms together with the axially projecting lock tabs 17 radially inwardly beyond the inner diameter surface 39 of the female member for seated reception into a matingly shaped external circumferential groove 40 in the tubular male member 22, when the male member is received into the female member, to block the male member 22 against axial separation relative to the female member 24 and thereby placing the coupling 10 in a locked condition. Conveniently, the locking arms 34 further include radially inwardly projecting shoulders 41 generally adjacent the central base 28 to engage the opposite ends of upper strip segment 42 of the female member to prevent the retainer 16 from falling off or being removed from the female member 24 during normal use.

The locking arms 34 cooperate with the lock tabs 17 and the groove 40 on the male member 22 to positively secure the coupling 10 against intended or inadvertent separation during normal use when the coupling is subjected to fluid pressure, such as water pressure flowing through the hoses. More particularly, the axial widths of the locking arms 34 are sufficiently less than the axial widths of the female member slots 38 to permit a minor or small degree of axial displacement between the fittings 12 and 14 when the otherwise locked coupling 10 is subjected to water pressure during use. This minor displacement is illustrated in FIG. 5 and is limited by movement of the retainer with the male member until the axial side faces 37 of the locking arms 34 presented toward the outboard flange 32 reach surface abutment with the adjacent axial side faces 43 of the respective arcuate slots 38. When this surface abutment occurs, the lock tabs 17 on the locking arms 34 projecting toward the outboard flange 32 are displaced to positions axially offset from the arcuate slots 38 and radially undercut with respect to a portion of the female member inner diameter surface 39 bordering said slots. In this position, any attempted radially outward movement of the locking arms 34 to retract said arms from the male member groove 40 is positively blocked by engagement of the lock tabs 17 with the inner diameter surface of the female member. Accordingly, when the locked coupling is subjected to water pressure, the lock tabs 17 on the locking arms 34 positively retain the coupling in the locked condition to prevent separation of the fittings.

When the water pressure is turned off, however, the hydraulic forces tending to axially separate the male and female fittings 12 and 14, as viewed in FIG. 5, are relaxed thereby permitting the male and female fittings to return to a normal locked configuration with the locking arms 34 and their lock tabs 17 substantially centered within the arcuate slots 38, as viewed in FIG. 4. In this relaxed but still locked condition, the coupling 10 is quickly and easily unlocked by pressing radially inwardly on the central spring base 28 of the retainer 16, as depicted by arrow 44 in FIG. 4. Such movement of the spring base presses the free ends 36 of the locking arms 34 against the generally radially oriented cam surfaces 45 on the female member 24 to displace the locking arms 34 generally tangentially and radially outwardly at a substantially uniform rate. This spreading movement of the locking arms retracts the inner edges 35 thereof along with the tabs 17 outwardly from the male member groove 40 to permit withdrawal of the male member 22 from the female member 24 to unlock the coupling. Conveniently, the radially outermost surfaces of the lock tabs 17 can be beveled slightly, as depicted by arrow 50 in FIG. 4, to facilitate normal return of the locking arms 34 toward positions generally axially centered within the slots 38 when the water pressure is turned off.

The coupling is quickly and easily returned to the locked condition without requiring depression of the spring retainer 16. More particularly, the free end of the tubular male member 22 conveniently includes a reduced diameter bevel 46 for radially spreading the locking arms 34 as the male member 22 is inserted toward a position with the groove 40 in axial alignment with the locking arms 34, at which time said arms 34 snap radially into the groove to lock the coupling together.

Fluid leakage between the male and female fittings 12 and 14 when the fittings are connected is preveted by a relatively simple seal structure including an annular seal washer 54 placed within the hose connector 26 of the female fitting 14 in a position for engagement by the free end of the male member 22. This seal washer 54 is held against an axialy presented shoulder 56 within the female fitting by a conventional hose washer 58 adapted for compressive engagement by the end of the hose 27 to be secured to the female fitting. Alternatively, if desired, the seal washer 54 and hose washer 58 can be combined into a single seal washer structure.

The improved quick connect coupling 10 of this invention thus provides a simplified and relatively inexpensive coupling device which can be used quickly and easily to connect or disconnect conduits, such as garden hose or the like. The improved coupling 10 advantageously includes means for positively locking the coupling against separation during use while the coupling is subjected to normal water pressures, while at the same time permitting accurate and easy disconnecting as required when water pressure is turned off in response to a single motion which can be achieved by one hand.

Various modifications and improvements to the invention described herein are believed to be apparent to one skilled in the art. Accordingly, no limitation on the invention is intended, except by way of the appended claims.

What is claimed is:

1. A quick connect coupling for releasably connecting a pair of fluid flow conduits, comprising:
   a male fitting for connection to one of the conduits and including a generally tubular male member having an external, generally circumferential groove formed therein;
   a female fitting for connection to the other conduit and including a generally sleeve-shaped female member with an open outboard end for sliding reception of said male member, said female member defining a generally opposed pair of arcuate slots;
   a generally C-shaped spring retainer having a generally opposed pair of locking arms including generally radially inner edges presented toward each other; and
   a pair of lock tabs supported respectively on said arms generally at said inner edges thereof and projecting axially therefrom in a common direction, said arms and tabs supported thereon each having a combined axial width for reception through said female member arcuate slots;
   said retainer being carried about said female member with said locking arms extending at least partially through said arcuate slots with said lock tabs projecting generally toward the outboard end of said female member, said locking arms being movable between locked and unlocked positions with said inner edges and said tabs resepectively projecting radially through said slots for reception into said male member groove to connect said fittings against axial separation and displaced radially outwardly from said male member groove to disconnect said fittings and permit axial separation thereof;
   said female member including a pair of generally radially oriented cam surfaces, and said locking arms having cam follower surfaces movably engageable with said cam surfaces to displace said locking arms between said locked and unlocked positions, said retainer being carried about said female member with said cam follower surfaces in engagement with said cam surfaces and movable between first positions and second positions for displacing said cam follower surfaces along said cam surfaces to move said locking arms between said locked and unlocked positions;
   said fittings being movable axially a short distance away from each other in response to fluid pressure within the conduits when said fittings are connected to displace said lock tabs to positions axially offset from said arcuate slots and radially within said female member whereby said tabs are engageable with the inner diameter surface of said female member to prevent radially outward movement of said locking arms relative to said male member groove.

2. The quick connect coupling of claim 1 wherein said arcuate slots are formed in said female member at a generally common axial position.

3. The quick connect coupling of claim 1 wherein said lock tabs are formed integrally with said locking arms.

4. The quick connect coupling of claim 1 wherein said lock tabs are supported on each of said locking arms generally at said inner edge thereof to project in opposite axial directions.

5. The quick connect coupling of claim 1 wherein said retainer is formed from a relatively rigid spring plastic having sufficient resiliency to permit movement of said locking arms a short distance generally toward and away from each other.

6. The quick connect coupling of claim 1 wherein said pair of generally radially oriented cam surfaces on said female member are formed generally at adjacent ends of said arcuate slots, and wherein said locking arms have first ends joined to a common central base and opposite free ends, said opposite free ends forming said cam follower surfaces, said retainer being carried about said female member with said locking arm free ends respectively engaging said cam surfaces, said central base being spaced radially from said female member when said locking arms are in the locked position, said central base being movable generally radially inwardly relative to said female member to displace said locking arms generally radially outwardly along said cam surfaces to move said locking arms to said unlocked position.

7. The quick connect coupling of claim 6 wherein said central base of said retainer is axially elongated relative to said locking arms, said female member having a cavity formed therein for reception of said central base.

8. The quick connect coupling of claim 1 wherein said arcuate slots each have an arcuate width on the order of from about 90 degrees to about 110 degrees.

9. The quick connect coupling of claim 1 including seal means for preventing fluid leakage between said male and female fittings.

10. The quick connect coupling of claim 1 wherein said female member has a radially outwardly open cavity formed therein for reception of said retainer.

11. The quick connect coupling of claim 1 wherein said retainer further includes means for biasing said locking arms normally to said locked position.

12. A quick connect coupling for releasably connecting a pair of fluid flow conduits, comprising:
   a male fitting for connection to one of the conduits and including a generally tubular male member having an external, generally circumferential groove formed therein;
   a female fitting for connection to the other conduit and including a generally sleeve-shaped female member with an open outboard end for sliding reception of said male member, said female member defining a generally opposed pair of arcuate slots; and a generally C-shaped spring retainer having a generally opposed pair of locking arms including generally radially inner edges presented toward each other, each of said locking arms supporting a pair of relatively short lock tabs projecting axially in opposite directions from a position generally at said inner edge thereof, said arms and tabs supported thereon each having a combined axial width for reception through said female member arcuate slots, said retainer being carried about said female member with said locking arms extending at least partially through said arcuate slots, said locking arms being movable between locked and unlocked positions with said inner edges and said tabs respectively projecting radially through said slots for reception into said male member groove to connect said fittings against axial separation and displaced radially outwardly from said male member groove to disconnect said fittings and permit axial separation thereof;

said female member including a pair of generally radially oriented cam surfaces, and said locking arms having first ends joined to a common central base and opposite free ends, said retainer being movably carried about said female member with said locking arm free ends respectively engaging said cam surfaces and said central base spaced radially from said female member and with said locking arms disposed in the locked position, said central base being movable generally radially inwardly relative to said female member to displace said locking arms generally radially outwardly with respect to said cam surfaces to move said locking arms to the unlocked position;

said fittings being movable axially a short distance away from each other in response to fluid pressure within the conduits when said fittings are connected to displace the ones of said lock tabs projecting axially toward the outboard end of said female member to positions axially offset from said arcuate slots and radially within said female member whereby said tabs are engageable with the inner diameter surface of said female member to prevent radially outward movement of said locking arms relative to said male member groove.

13. The quick connect coupling of claim 15 wherein said retainer is formed from a relatively rigid spring plastic having sufficient resiliency to accommodate movement of said locking arms a short distance generally toward and away from each other, said retainer being formed with said locking arms normally in said locked position.

* * * * *

UNITED STATES PATENT AND TRADEMARK OFFICE
CERTIFICATE OF CORRECTION

PATENT NO. : 4,591,192                                     Page 1 of 2

DATED : May 27, 1986

INVENTOR(S) : Gary A. Van Exel, et al.

It is certified that error appears in the above-identified patent and that said Letters Patent is hereby corrected as shown below:

In Column 1, line 57, please delete the word "relative" and insert therefor --relatively--.

In Column 2, line 17, please delete the word "simultaneusly" and insert therefor --simultaneously--.

In Column 2, line 24, please delete the word "where" and insert therefor --wherein--.

In Column 3, line 1, please delete the word "Th" and insert therefor --The--.

In Column 4, line 43, please delete the number "15" and insert therefor --25--.

In Column 5, line 4, please delete the word "prevnt" and insert therefor --prevent--.

In Column 5, line 15, please delete the word "radialy" and insert therefor --radially--.

In Column 6, line 61, please delete the word "preveted" and insert therefor --prevented--.

UNITED STATES PATENT AND TRADEMARK OFFICE
CERTIFICATE OF CORRECTION

PATENT NO. : 4,591,192

DATED : May 27, 1986

INVENTOR(S) : Gary A. Van Exel, et al.

It is certified that error appears in the above-identified patent and that said Letters Patent is hereby corrected as shown below:

In Column 6, line 66, please delete the word "axialy" and insert therefor -- axially --.

Signed and Sealed this

Twenty-third Day of December, 1986

Attest:

DONALD J. QUIGG

Attesting Officer     Commissioner of Patents and Trademarks